(12) United States Patent
Walke

(10) Patent No.: US 7,748,672 B2
(45) Date of Patent: Jul. 6, 2010

(54) TRANSFERABLE PATIENT CARE EQUIPMENT SUPPORT

(75) Inventor: James L. Walke, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 207 days.

(21) Appl. No.: 11/851,493

(22) Filed: Sep. 7, 2007

(65) Prior Publication Data

US 2009/0065668 A1 Mar. 12, 2009

(51) Int. Cl.
*A47F 5/00* (2006.01)
(52) U.S. Cl. ..................................... 248/207
(58) Field of Classification Search ............ 248/288.11, 248/289.11, 292.12; 74/813 L, 813 R; 403/92, 403/93, 94, 95, 96
See application file for complete search history.

(56) References Cited

U.S. PATENT DOCUMENTS

| | | | |
|---|---|---|---|
| 383,815 | A | 5/1888 | Kilborn |
| 1,290,809 | A | 1/1919 | Truax |
| 1,490,650 | A | 4/1924 | Wagner |
| 1,919,114 | A | 7/1933 | Ley |
| 2,470,524 | A | 5/1949 | Scudder |
| 2,497,425 | A | 2/1950 | Terry |
| 2,673,771 | A | 3/1954 | Krewson |
| 2,696,963 | A | 12/1954 | Sheperd |
| 3,004,743 | A | 10/1961 | Wenger |
| 3,213,877 | A | 10/1965 | May et al. |
| 3,431,937 | A | 3/1969 | Hettlingr et al. |
| 3,552,577 | A | 1/1971 | Latham, Jr. |
| 3,674,294 | A | 7/1972 | Kirkham |
| 3,709,556 | A | 1/1973 | Allard et al. |
| 3,814,023 | A | 6/1974 | Stantial |
| 4,005,844 | A | 2/1977 | Richmond |
| 4,094,484 | A | 6/1978 | Galione |
| 4,113,222 | A | 9/1978 | Frinzel |
| 4,190,224 | A | 2/1980 | LeBlanc et al. |

(Continued)

FOREIGN PATENT DOCUMENTS

DE 92 04 321.6 5/1992

(Continued)

OTHER PUBLICATIONS

"Pump Star User's Manual", The Headwall Company, Modular Services Company, Dec. 22, 2005, 11 pages.

(Continued)

*Primary Examiner*—J. Allen Shriver, II
*Assistant Examiner*—Erin Smith
(74) *Attorney, Agent, or Firm*—Barnes & Thornburg LLP

(57) ABSTRACT

A patient care equipment support is transferable between a first device having a first coupling member and a second device having a second coupling member. The equipment support comprises an equipment supporting portion configured to support patient care equipment, and a coupler extending downwardly from the equipment supporting portion. The coupler has a central opening and a plurality of peripheral openings disposed about the central opening. The first coupling member engages the central opening and at least one of the peripheral openings when the equipment support is carried by the first device. The second coupling member engages the central opening and at least one of the remaining peripheral openings when the equipment support is transferred to the second device.

29 Claims, 12 Drawing Sheets

U.S. PATENT DOCUMENTS

| | | | |
|---|---|---|---|
| 4,225,104 A | 9/1980 | Larson | |
| 4,262,874 A | 4/1981 | Seigh | |
| D260,816 S | 9/1981 | Zissimopoulos et al. | |
| 4,339,104 A | 7/1982 | Weidman | |
| 4,378,014 A | 3/1983 | Elkow | |
| 4,489,454 A | 12/1984 | Thompson | |
| 4,511,157 A | 4/1985 | Wilt, Jr. | |
| 4,511,158 A | 4/1985 | Varga et al. | |
| 4,559,036 A | 12/1985 | Wunsch | |
| 4,600,209 A | 7/1986 | Kerr, Jr. | |
| 4,616,797 A | 10/1986 | Cramer | |
| D289,604 S | 5/1987 | Gallant et al. | |
| 4,691,397 A | 9/1987 | Netzer | |
| 4,718,892 A | 1/1988 | Yung-Ho | |
| 4,725,027 A | 2/1988 | Bekanich | |
| 4,729,576 A | 3/1988 | Roach | |
| 4,738,369 A | 4/1988 | Desjardins | |
| 4,742,614 A * | 5/1988 | Mack et al. | 29/785 |
| 4,744,536 A | 5/1988 | Bancalari | |
| 4,753,446 A * | 6/1988 | Mills | 280/47.18 |
| 4,756,706 A | 7/1988 | Kerns et al. | |
| 4,795,122 A | 1/1989 | Petre | |
| 4,879,798 A | 11/1989 | Petre | |
| 4,892,279 A | 1/1990 | Lafferty et al. | |
| 4,901,967 A | 2/1990 | Petre | |
| 4,905,882 A | 3/1990 | Ross | |
| 4,905,944 A | 3/1990 | Jost et al. | |
| 4,925,444 A | 5/1990 | Orkin et al. | |
| 4,945,592 A | 8/1990 | Sims et al. | |
| 4,966,340 A | 10/1990 | Hunter | |
| 4,969,768 A | 11/1990 | Young | |
| 4,997,150 A | 3/1991 | Mardollo | |
| 5,016,307 A | 5/1991 | Rebar | |
| 5,078,349 A | 1/1992 | Smith | |
| 5,083,807 A | 1/1992 | Bobb et al. | |
| 5,094,418 A | 3/1992 | McBarnes, Jr. et al. | |
| 5,110,076 A | 5/1992 | Snyder et al. | |
| 5,112,019 A | 5/1992 | Metzler et al. | |
| 5,125,607 A | 6/1992 | Pryor | |
| 5,135,191 A | 8/1992 | Schmuhl | |
| 5,149,036 A | 9/1992 | Sheehan | |
| 5,207,642 A | 5/1993 | Orkin et al. | |
| 5,219,139 A | 6/1993 | Hertzler et al. | |
| 5,224,681 A | 7/1993 | Lundstrom | |
| 5,306,109 A | 4/1994 | Kreuzer et al. | |
| 5,319,816 A | 6/1994 | Ruehl | |
| 5,326,059 A | 7/1994 | Pryor et al. | |
| 5,337,992 A | 8/1994 | Pryor et al. | |
| 5,344,169 A | 9/1994 | Pryor et al. | |
| 5,366,191 A | 11/1994 | Bekanich | |
| 5,400,995 A | 3/1995 | Boyd | |
| 5,407,163 A | 4/1995 | Kramer et al. | |
| 5,421,548 A | 6/1995 | Bennett et al. | |
| 5,527,125 A | 6/1996 | Kreuzer et al. | |
| 5,556,065 A * | 9/1996 | Wadley | 248/129 |
| 5,588,166 A | 12/1996 | Burnett | |
| 5,618,090 A | 4/1997 | Montague et al. | |
| 5,636,823 A | 6/1997 | Boyd | |
| 5,647,491 A | 7/1997 | Foster et al. | |
| 5,657,884 A | 8/1997 | Zilincar, III | |
| D384,500 S * | 10/1997 | Muench | D3/259 |
| 5,699,988 A | 12/1997 | Boettger et al. | |
| 5,704,577 A | 1/1998 | Gordon | |
| 5,857,685 A | 1/1999 | Phillips et al. | |
| 5,876,016 A | 3/1999 | Urban et al. | |
| 5,878,536 A | 3/1999 | Demmitt et al. | |
| 5,898,961 A | 5/1999 | Ambach et al. | |
| 5,924,658 A | 7/1999 | Shiery et al. | |
| 5,966,760 A | 10/1999 | Gallant et al. | |
| 5,987,670 A | 11/1999 | Sims et al. | |
| 6,056,249 A | 5/2000 | Fillom, Jr. | |
| 6,073,285 A | 6/2000 | Ambach et al. | |
| 6,109,572 A | 8/2000 | Urban et al. | |
| 6,155,743 A | 12/2000 | Chen | |
| 6,170,102 B1 | 1/2001 | Kreuzer | |
| 6,179,260 B1 | 1/2001 | Chanian | |
| 6,182,662 B1 | 2/2001 | McGhee | |
| 6,213,481 B1 | 4/2001 | Marchese et al. | |
| 6,231,016 B1 | 5/2001 | Slone | |
| 6,375,133 B1 | 4/2002 | Morrow | |
| 6,390,311 B1 | 5/2002 | Belokin | |
| 6,434,329 B1 | 8/2002 | Dube et al. | |
| D462,256 S * | 9/2002 | Jaynes | D8/382 |
| 6,601,860 B2 | 8/2003 | Potter | |
| 6,619,599 B2 | 9/2003 | Elliott et al. | |
| 6,708,991 B1 | 3/2004 | Ortlieb | |
| 6,725,483 B2 | 4/2004 | Gallant et al. | |
| 6,966,086 B2 * | 11/2005 | Metz et al. | 5/510 |
| 2002/0047075 A1 | 4/2002 | Metz et al. | |
| 2002/0104934 A1 | 8/2002 | Elliott et al. | |
| 2003/0014817 A1 | 1/2003 | Gallant et al. | |
| 2004/0199996 A1 | 10/2004 | Newkirk et al. | |
| 2005/0000019 A1 | 1/2005 | Newkirk et al. | |
| 2005/0253034 A1 | 11/2005 | Bally et al. | |
| 2006/0249641 A1 | 11/2006 | Bally et al. | |

FOREIGN PATENT DOCUMENTS

| | | |
|---|---|---|
| DE | 92 04 3216 U1 | 7/1992 |
| EP | 0 943 306 B1 | 9/1999 |
| EP | 1 243 900 A2 | 9/2002 |
| GB | 1 061 383 | 3/1967 |
| WO | 00/09061 | 2/2000 |

OTHER PUBLICATIONS

"Modular Pump Star", The Headwall Company, Modular Services Company, 2005, 4 pages.

* cited by examiner

US 7,748,672 B2

TRANSFERABLE PATIENT CARE EQUIPMENT SUPPORT

FIELD OF THE INVENTION

The present disclosure relates to a patient care equipment support, and more particularly relates to a patient care equipment support that is transferable, for example, from a first device, such as a hospital bed, to a second device, such as an arm system, to a third device, such as a wheeled cart or stand, in any order.

BACKGROUND OF THE INVENTION

Hospitalized patients often require patient care equipment to be in close proximity during hospital care. Such patient care equipment is typically supported on a patient care equipment support such as, an IV pole, a rack, a shelf system, a cabinet, and the like. Illustrative examples of patient care equipment include, but are not limited to, the following: heart monitoring equipment, medical gas delivery equipment, intra-venous (IV) bags, infusion management equipment, equipment monitors, patient monitors, defibrillators, and the like, many of which are configured to directly connect to the patient via lines or tubes.

It is desirable that patient care equipment is transferable between a patient support, such as a hospital bed, a support structure, such as an arm system, and a wheeled cart or stand. An illustrative patient care equipment support that is transferable between a hospital bed, an arm system and a wheeled cart or stand is disclosed in a U.S. Patent Application, Publication No. US-2006-0242763-A1, which application is hereby incorporated by reference herein.

SUMMARY OF THE INVENTION

The present invention comprises an apparatus or a method having one or more of the features recited in the claims or one or more of the following features, which alone or in any combination may comprise patentable subject matter:

A patient care equipment support may be transferable from a first device having a first coupling member to a second device having a second coupling member. The equipment support may comprise an equipment supporting portion configured to support patient care equipment and a coupler extending downwardly from the equipment supporting portion. The equipment support coupler may have a central opening and a plurality of peripheral openings disposed about the central opening. The plurality of peripheral openings may be arranged in a generally circular pattern concentric with the central opening. The first coupling member may engage the central opening and at least one of the peripheral openings when the equipment support is carried by the first device. The second coupling member may engage the central opening and at least one of the remaining peripheral openings when the equipment support is transferred to the second device.

The equipment support coupler may comprise a post that extends downwardly from the equipment supporting portion and an annular ring coupled to a lower portion of the post. The post may have the central opening and the annular ring may have the plurality of the peripheral openings. The central opening may be located at a lower elevation than the plurality of the peripheral openings. The central opening may open through a downwardly-facing surface of the post. The post may have a generally circular cross section. The post may have a first portion that extends above the annular ring and a second portion that extends below the annular ring. A first distance between the annular ring and the equipment supporting portion may be greater than a second distance between the annular ring and a lower end of the post. The post may be rotatable relative to the annular ring about a longitudinal axis of the post.

Each peripheral opening may have a non-round, such as a generally heart-shaped, cross section. Each peripheral opening may have an upwardly tapering conical wall. The plurality of peripheral openings may comprise ten openings arranged in a generally circular pattern concentric with the central opening. The equipment support may comprise one of an IV pole and a rack adapted to carry infusion equipment. The first device may comprise a hospital bed. The second device may comprise an arm system. In some embodiments, the equipment support may be transferable from the first device or the second device to a third device, such as a wheeled cart or stand, having a third coupling member.

The equipment support may be transferred from the first device to the second device as the first coupling member carrying the equipment support is lowered while the second coupling member is generally aligned with the central opening and at least one of the remaining peripheral openings to a position where the first coupling member is at a lower elevation than the second coupling member permitting the second device to carry the equipment support and allowing the first device to move away from the second device (or allowing the second device to move away from the first device).

Alternatively, the equipment support may be transferred from the first device to the second device by raising the second coupling member while the second coupling member is generally aligned with the central opening and at least one of the remaining peripheral openings to a position where the second coupling member is at a higher elevation than the first coupling member permitting the second device to carry the equipment support and allowing the first device to move away from the second device (or allowing the second device to move away from the first device).

In some embodiments, a device, such as a hospital bed, may comprise a support, an arm extending outwardly from the support, and a coupling member carried by the arm. The coupling member may comprise an upwardly-extending central pin configured for receipt in the central opening of the equipment support coupler and a pair of upwardly-extending laterally-spaced pins configured for receipt in two of the plurality of peripheral openings of the equipment support coupler when the equipment support is carried by the device.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the following figures, in which.

DETAILED DESCRIPTION OF THE DRAWINGS

Figure 1:
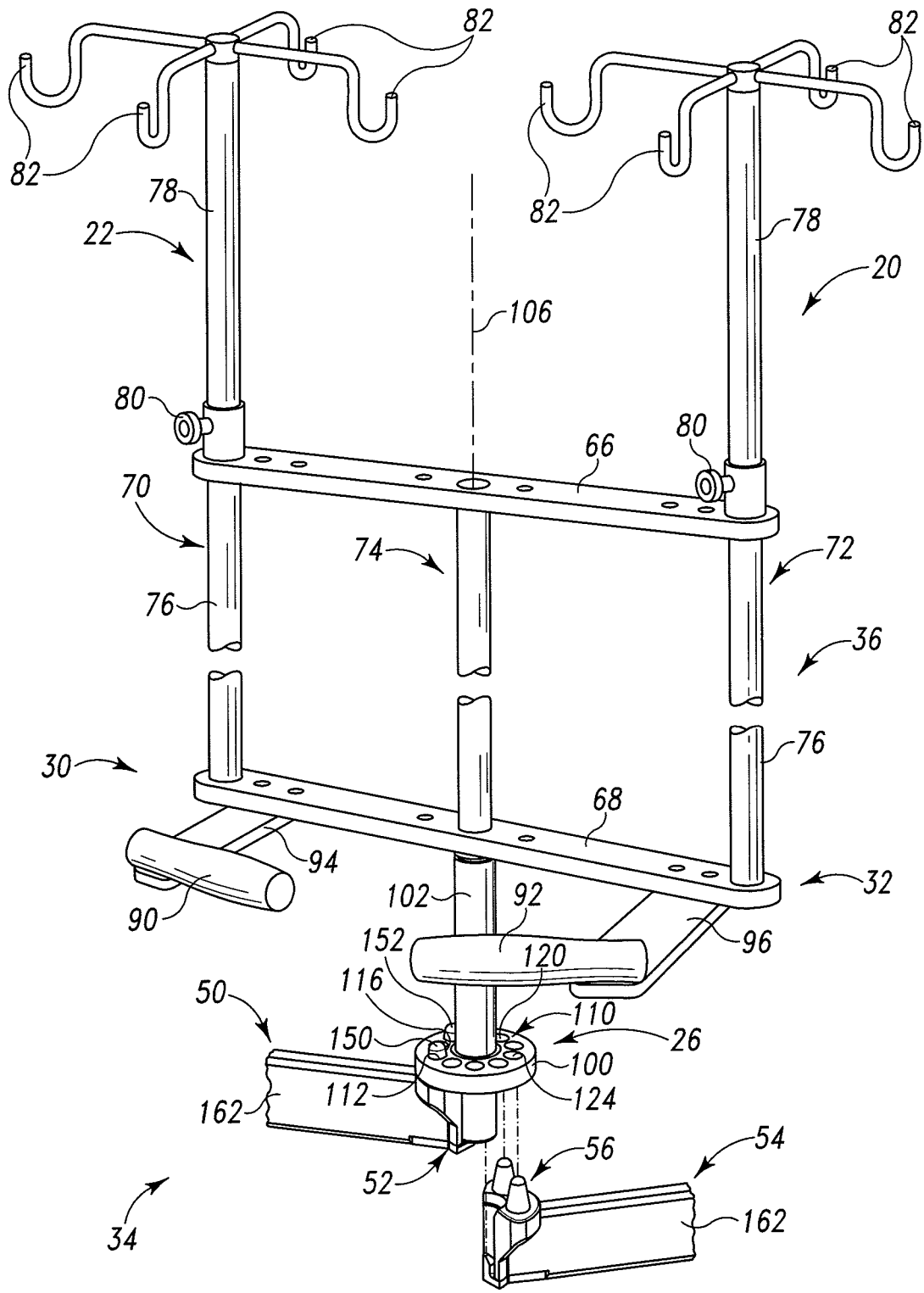
FIG. 1 is a perspective view showing a patient care equipment support being transferred from a first coupling member of a first device, such as a hospital bed (not shown), to a second coupling member of a second device, such as an arm system (not shown), and showing the equipment support having an equipment supporting portion and a coupler coupled thereto, the equipment supporting portion having upper and lower cross bars, a central post and a pair of outer posts extending between the upper and lower cross bars, and a plurality of IV bag hooks coupled to upper ends of the outer posts, the equipment support coupler having an annular ring coupled to a lower portion of the central post that extends below the lower cross bar, the lower portion of the central post having a downwardly-facing central opening, the annular ring having a plurality of peripheral openings that are arranged in a generally circular pattern concentric with the central opening, and each device coupling member having an upwardly-extending central pin configured for receipt in the downwardly-facing central opening in the lower portion of the central post and a pair of upwardly-extending laterally-spaced pins configured for receipt in two of the plurality of peripheral openings in the annular ring when the equipment support is carried by the associated device.

FIG. 1 shows an equipment support 20 having an equipment supporting portion 22 configured to support patient care equipment 24 (FIGS. 6-7) and a coupler 26 extending downwardly from the equipment supporting portion 22. The equipment support 20 has a left side 30, a right side 32, a front side 34, and a rear side 36. As explained below, the equipment support 20 is directly transferable from a first device, such as a hospital bed 50 (FIG. 6) having a first coupling member 52 (FIGS. 1-2), to a second device, such as an arm system 54 (FIG. 7) having a second coupling member 56 (FIGS. 1-3), to a third device, such as a wheeled cart 58 (FIG. 8) having a third coupling member 60, and back to the hospital bed 50 having the first coupling member 52, in any order. For example, the equipment support 20 may be transferred from the bed 50 to the arm system 54 to the cart 58 and back to the bed 50 or from the bed 50 to the cart 58 to the arm system 54 and back to the bed 50.

It should be understood that although, in the illustrated embodiment, the equipment support 20 is supported by the bed 50, the arm system 54, and the wheeled cart 58, the equipment support 20 may very well be supported by other devices, such as a stretcher, a surgical table, a wheel chair, a wheeled stand, and the like, that have coupling members that are configured to engage the equipment support coupler 26. The bed 50 may be of the type marketed by Hill-Rom Company, Inc. as TotalCare™ hospital bed. The arm system 54 may be of the type marketed by Hill-Rom Company, Inc. as Latitude™ Arm System.

As shown in FIG. 1, the equipment supporting portion 22 includes an upper cross bar 66, a lower cross bar 68, and a pair of telescoping outer posts 70, 72 extending between the upper and lower cross bars 66, 68 adjacent the opposite sides 30, 32 thereof. A central post 74 extends between the upper and lower cross bars 66, 68 between the two outer posts 70, 72. In the illustrated embodiment, the three posts 70, 72, 74 have a circular cross section having a diameter of about 1.250 inches. Each outer post 70, 72 has an outer tube 76 and an inner tube 78 that telescopes into and out of the outer tube 76. Each outer post 70, 72 includes a lock 80 that is movable between a releasing position allowing the inner tube 78 to telescope into and out of the outer tube 76 and a locking position blocking the inner tube 78 from telescoping relative to the outer tube 76. Each outer post 70, 72 includes a plurality of IV bag hooks 82 coupled to an upper end of the associated inner tube 78. A pair of handles 90, 92 are coupled to the lower cross bar 68 via respective handle bars 94, 96 that extend forwardly from the lower cross bar 68 adjacent the outer posts 70, 72.

Figure 2:
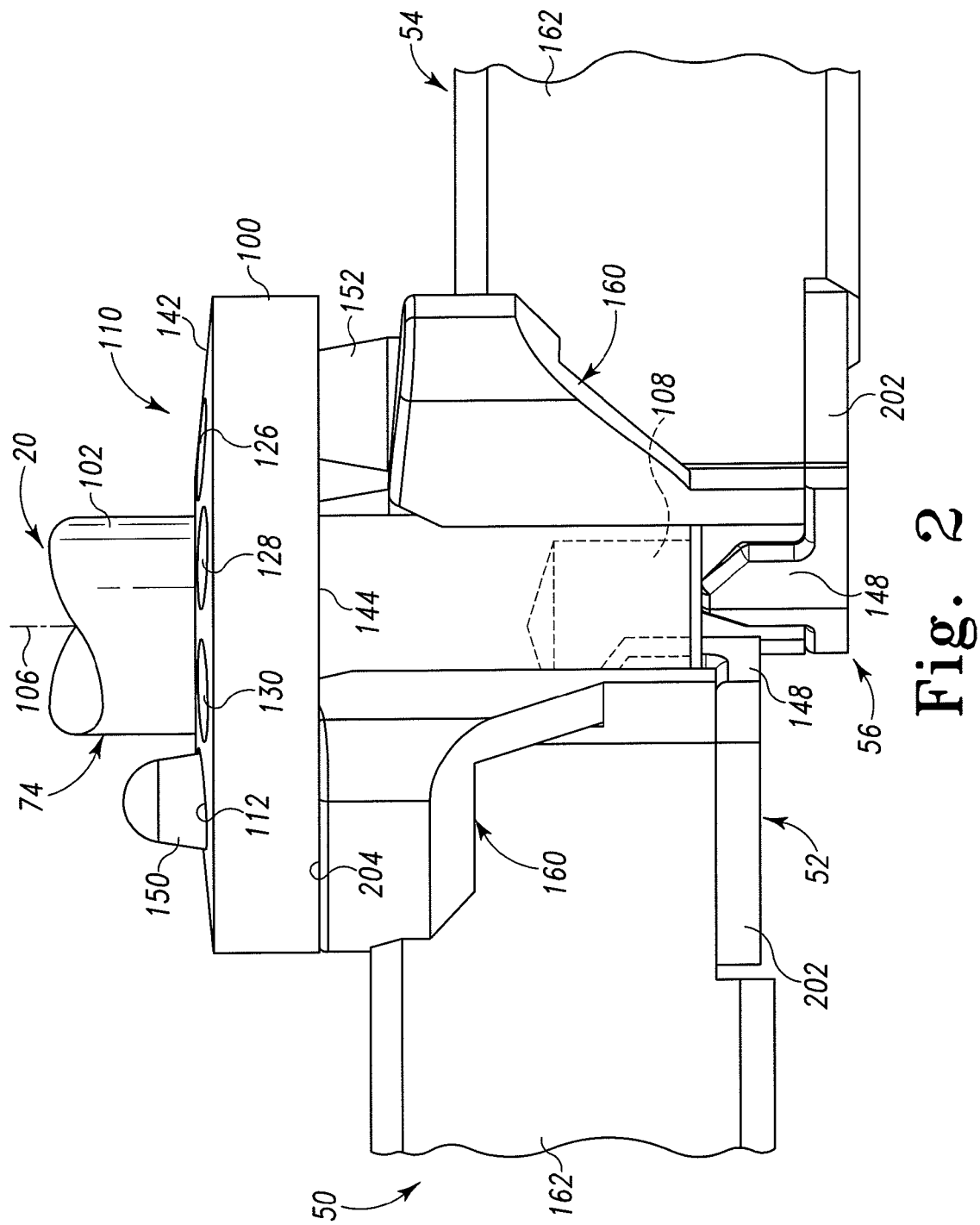
FIG. 2 is an enlarged side elevation view showing the central pin of the first coupling member received in the central opening in the lower portion of the central post and two laterally-spaced pins of the first coupling member received in the associated peripheral openings in the annular ring, and showing the central pin of the second coupling member positioned just below the central opening of the central post and the two laterally-spaced pins of the second coupling member partially received in the associated peripheral openings in the annular ring.
Figure 3:
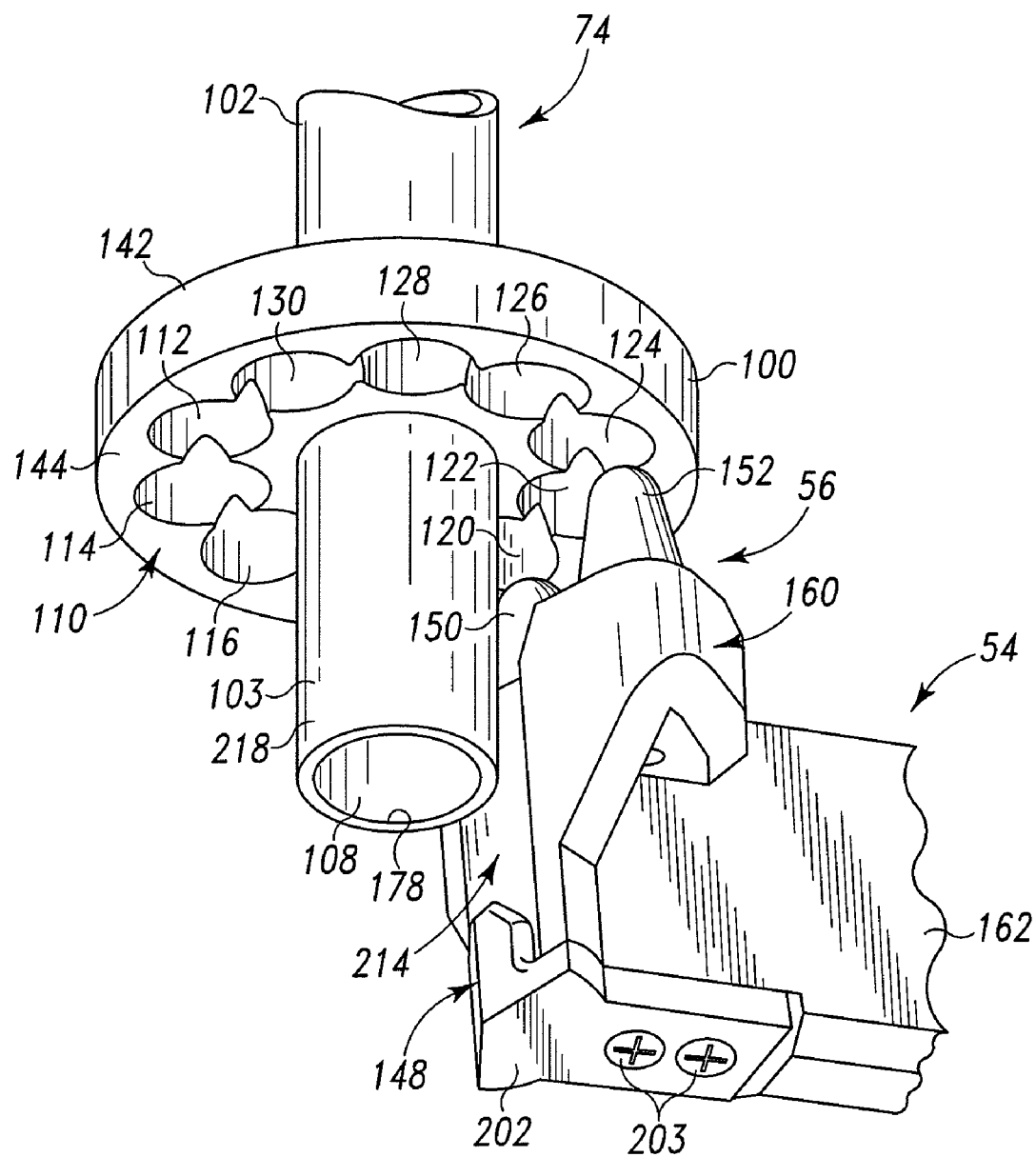
FIG. 3 is an enlarged perspective view showing the central pin of the second coupling member positioned below the central opening of the central post and the two laterally-spaced pins of the second coupling member positioned below the associated peripheral openings in the annular ring, the first coupling member shown in FIGS. 1 and 2 is omitted in FIG. 3 to promote clarity.

As shown in FIGS. 1-3, the equipment support coupler 26 includes an annular ring 100 coupled to a lower portion 102 of the central post 74 that extends below the lower cross bar 68. The annular ring 100 has a bore 104 (FIG. 4) through which the lower portion 102 of the central post 74 extends. In the illustrated embodiment, the lower portion 102 of the central post 74 is fixedly received in the bore 104. However, in some embodiments, the lower portion 102 of the post 74 is received in the bore 104 for pivoting movement about a longitudinal axis 106 of the central post 74 to allow the equipment supporting portion 22 to pivot relative to the annular ring 100. The pivotable mounting of the equipment supporting portion 22 improves caregiver access to the patient care equipment 24 carried by the equipment supporting portion 22. The annular ring 100 has top and bottom surfaces 142, 144. In the illustrated embodiment, as shown in FIG. 2, the top surface 142 of the annular ring 100 is tapered, with thickness of the annular ring 100 reducing toward its outer peripheral edge. In other embodiments, however, the top surface 142 of the annular ring 100 may be flat.

Figure 4:
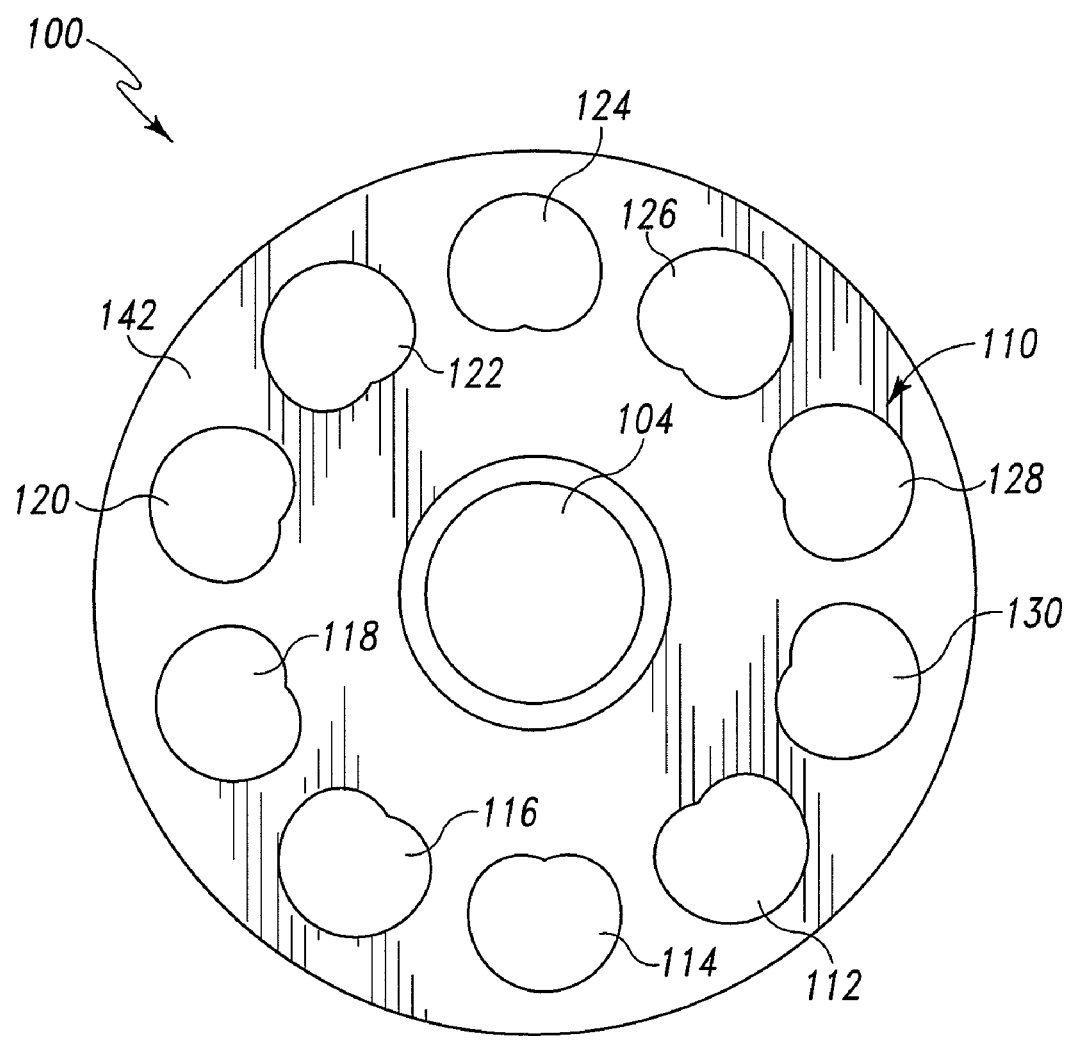
FIG. 4 is a plan view of the annular ring having the peripheral openings, which are exaggerated to show their heart-shaped cross-section.

As shown in FIG. 3, the lower portion 102 of the central post 74 has a downwardly-facing central opening 108. As shown in FIGS. 3-4, the annular ring 100 has a plurality of peripheral openings 110 that are arranged in a generally circular pattern concentric with the central opening 108 in the lower portion 102 of the central post 74. In the embodiment shown in FIGS. 3-4, the annular ring 100 has ten (10) equi-spaced peripheral openings 110, which are numbered 112, 114, 116, 118, 120, 122, 124, 126, 128, and 130. In other embodiments, however, the annular ring 100 may have greater than or less than ten (10) peripheral openings. In the illustrated embodiment, as shown in FIG. 3, the central opening 108 is located below the plurality of the peripheral openings 110. In the illustrated embodiment, a first distance between the annular ring 100 and the equipment supporting portion 22 is greater than a second distance between the annular ring 100 and a lower end of the central post 74.

Figure 9:
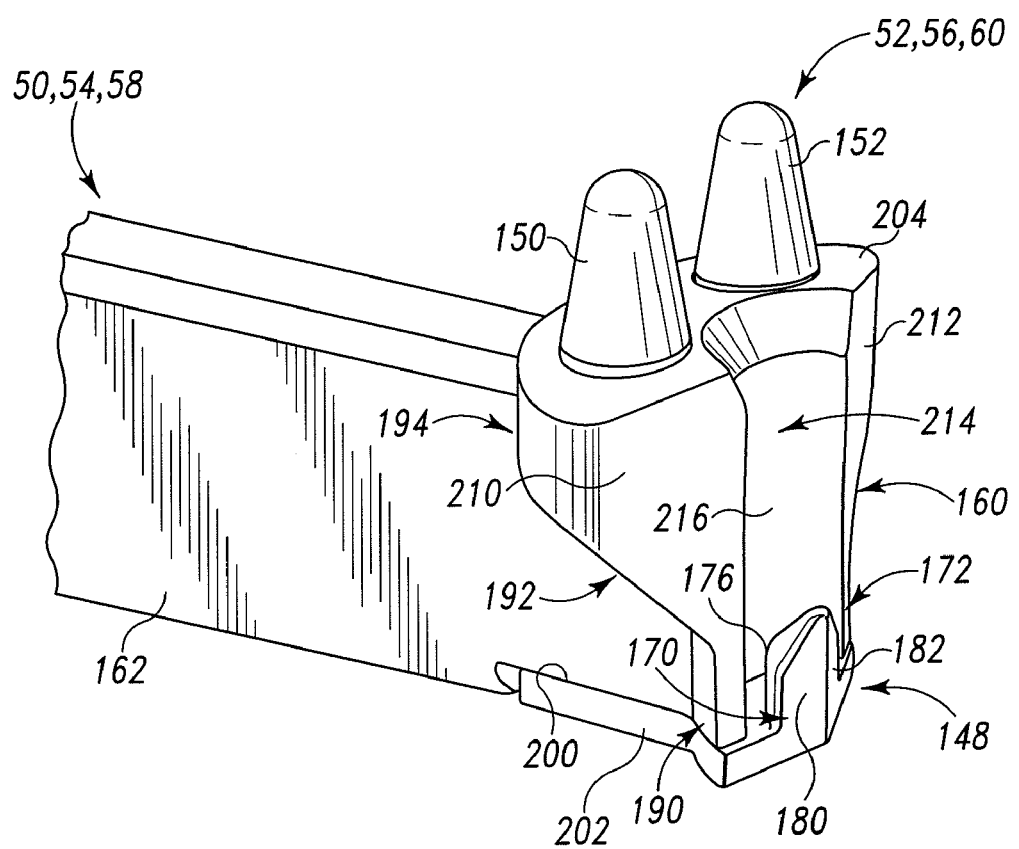
FIG. 9 is a perspective view of the device coupling member having a body carrying an upwardly-extending central pin and a pair of upwardly-extending laterally-spaced pins.
Figure 10:
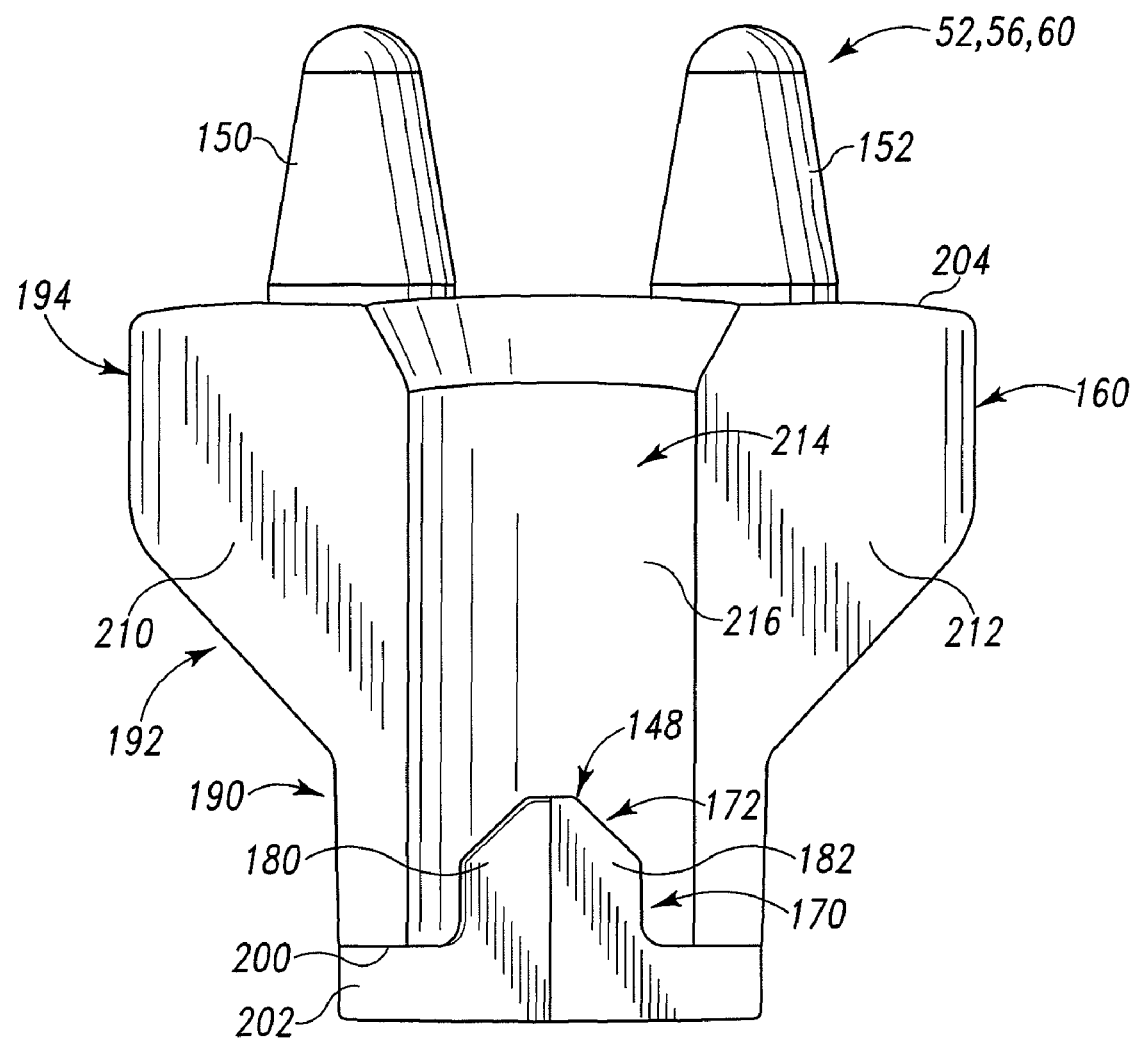
FIG. 10 is a front elevation view of the device coupling member.
Figure 11:
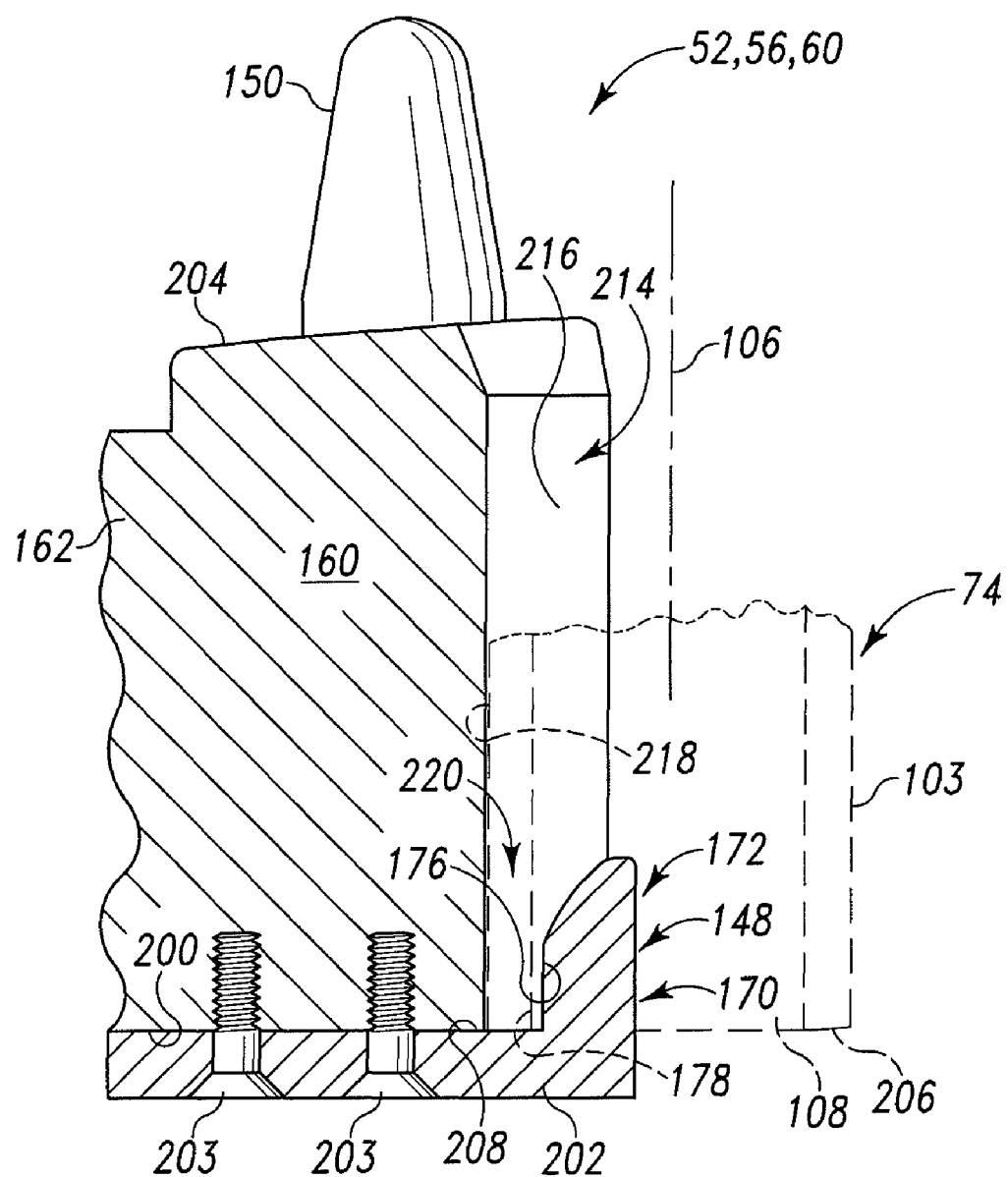
FIG. 11 is a cross sectional side view of the device coupling member.

As shown in FIGS. 9-11, each device coupling member 52, 56, 60 includes an upwardly-extending central pin 148 and a pair of upwardly-extending laterally-spaced pins 150, 152. When the equipment support 20 is carried by the coupling member 52, 56, 60, the central lower pin 148 is received in the central opening 108 in the lower portion 102 the central post 74 and the laterally-spaced upper pins 150, 152 are received in two of the plurality of peripheral openings 110 in the annular ring 100, for example, the peripheral openings 112, 116 with respect to the first coupling member 52 as shown in FIG. 1. The three pins 148, 150, 152 provide a stable three-point support to the equipment support 20. The plurality of openings 110 in the annular ring 100 provide a certain degree of flexibility in positioning the arms 162 carrying the support pins 148, 150, 152 during the transfer of the equipment support 20 from a first one of the devices 50, 54, 58 to a second one of the devices 50, 54, 58. In the illustrated embodiment, 1) the diameter of the tapered upper pins 150, 152 at their base is about 0.750 inches, 2) the thickness of the lower pin 148 at its base is about 0.350 inches, 3) the width of the lower pin 148 at its base is about 0.700 inches, and 4) the diameter of the central opening 108 is between about 1.000 inches.

Illustratively, the peripheral openings 110 open through the top and bottom surfaces 142, 144 of the annular ring 100. The angular spacing between each pair of adjacent peripheral openings 112 and 114, 114 and 116, 116 and 118, 118 and 120, 120 and 122, 122 and 124, 124 and 126, 126 and 128, 128 and 130, 130 and 112 is about 36°. The angular spacing between each pair of non-adjacent peripheral openings 112 and 116, 114 and 118, 116 and 120, 118 and 122, 120 and 124, 122 and 126, 124 and 128, 126 and 130, 128 and 112, 130 and 114 is about 72°. As indicated above, in the illustrated embodiment, the laterally-spaced pins 150, 152 are configured to be received in a pair of non-adjacent peripheral openings, such as for example, the peripheral openings 112 and 116 to improve stability. In other embodiments, however, the laterally-spaced pins 150, 152 may be received in a pair of adjacent peripheral openings, such as for example, the peripheral openings 112 and 114.

In the illustrated embodiment, the peripheral openings 110 are not cylindrical tapered holes. Instead, as shown in FIG. 4, each peripheral opening 110 has a somewhat heart-shaped cross section. The heart-shaped cross section of the peripheral openings 110 facilitates engagement between the laterally-spaced pins 150, 152 of the device coupling members 52, 56, 60 and the peripheral openings 110 in the annular ring 100 even when the alignment between the axes of the pins 150, 152 and the axes of the openings 110 is slightly off as the annular ring 100 is lowered to engage the pins 150, 152 or the pins 150, 152 are raised to engage the annular ring 100. The non-alignment between the axes of the pins 150, 152 and the axes of the associated openings 110 may occur, for example, because the floor on which the bed 50 or the cart 58 is supported is sloping or uneven or the bed 50 is disposed in a Trendelenburg or a reverse-Trendelenburg position.

Figure 5:
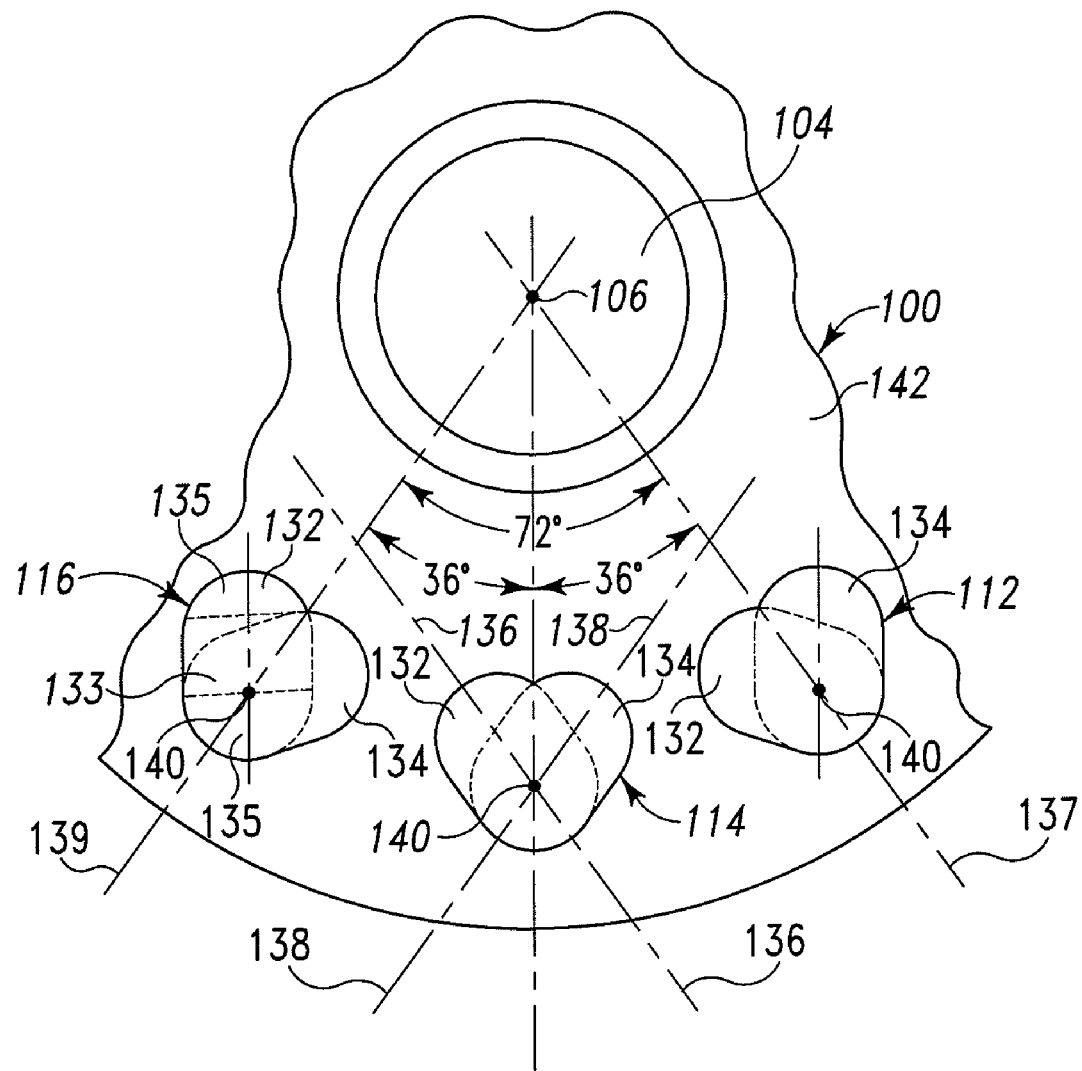
FIG. 5 is an enlarged partial view of the annular ring diagrammatically showing the heart-shaped cross-section.

As shown in FIG. 5, in the illustrated embodiment, each peripheral opening 110 comprises two slightly oblong slots 132, 134. In the illustrated embodiment, each slot 132, 134 comprises a generally rectangular middle portion 133 and two generally semicircular end portions 135 disposed on opposite sides of the rectangular portion 133. The longitudinal axes 136, 138 of the two oblong slots 132, 134 defining each opening 110 extend through a nominal center 140 of said peripheral opening 110. In the illustrated embodiment, the longitudinal axes 136, 138 of the oblong slots 132, 134 defining each opening 110 are parallel to respective diameters 137, 139 extending through the nominal centers 140 of the two openings 110 on the opposite sides of said opening 110. Thus, the longitudinal axes 136, 138 of the oblong slots 132, 134 defining the opening 114 are parallel to diameters 137, 139 extending through the nominal centers 140 of the openings 112, 116 on the opposite sides of the opening 114. Illustratively, 1) the rectangular middle portion 133 has a longitudinal dimension of 0.010 inches, 2) the two end portions 135 have a radius of 0.375 inches, and 3) the slots 132, 134 have a longitudinal dimension of 0.760 inches.

In the illustrated embodiment, the angle between the longitudinal axes 136, 138 of the two oblong slots 132, 134 is about 72°. The oblong slots 132, 134 defining each peripheral opening 110 reduce the tendency of the pins 150, 152 to bind during the transfer of the equipment support 20 from a first one of the devices 50, 54, 58 to a second one of the devices 50, 54, 58, especially when the axes of the pins 150, 152 and the axes of the associated openings 110 are not aligned as the equipment support 20 is lowered to engage the pins 150, 152 or the pins 150, 152 are raised to engage the openings 110. In addition, the downward taper of the peripheral openings 110 causes the pins 150, 152 to self align in the openings 110 if the pins 150, 152 are not aligned and there is some allowable movement. Further, the two slots 132, 134 defining each opening 110 allow two different orientations (about 72° apart) of the arms 162 carrying the pins 148, 150, 152 during the transfer of the equipment support 20 from a first one of the devices 50, 54, 58 to a second one of the devices 50, 54, 58. Although, in the illustrated embodiment, the peripheral openings 110 have a heart-shaped cross section, the openings 110 may very well have some other cross section in other embodiments. For example, in some embodiments, the openings 110 are tapered cylindrical holes.

Figure 12:
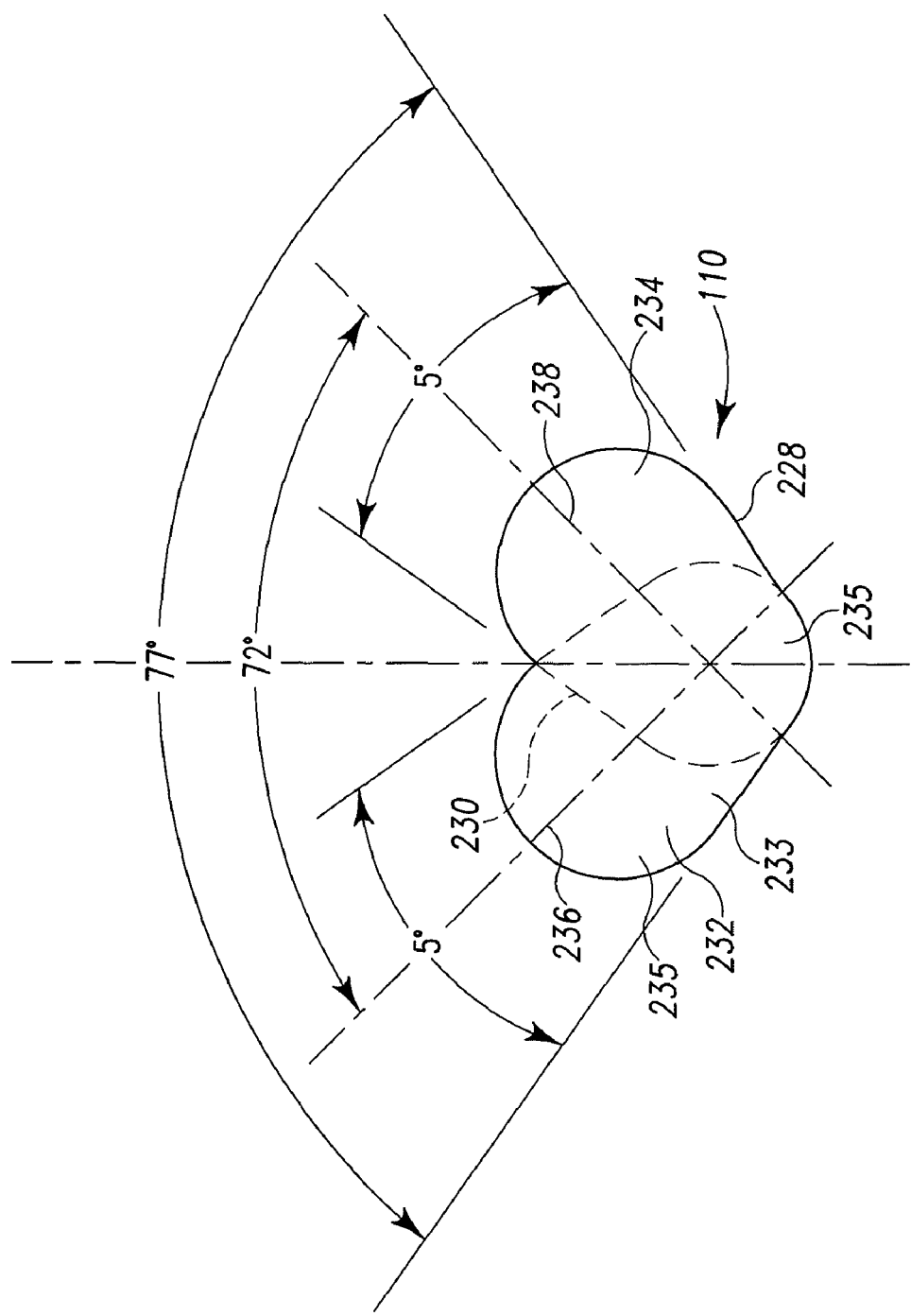
FIG. 12 is a diagrammatic representation of an alternative heart-shaped cross-section of a peripheral opening in the annular ring.

FIG. 12 is a diagrammatic representation of an alternative heart-shaped cross-section of the peripheral openings 110 in the annular ring 100 to reduce the tendency of the pins 150, 152 to bind during the transfer of the equipment support 20 from from a first one of the devices 50, 54, 58 to a second one of the devices 50, 54, 58. In the embodiment illustrated in FIG. 12, 1) the angle between the longitudinally-extending side edges 228, 230 of each oblong slot 232, 234 defining a peripheral opening 110 is about 5°, 2) the angle between the longitudinal axes 236, 238 of the two oblong slots 232, 234 is about 72°, 3) the two end portions 235 have a radius of about 0.375 inches, 4) the rectangular middle portion 233 has a longitudinal dimension of about 0.010 inches, and 5) the slots 232, 234 have a longitudinal dimension of about 0.760 inches.

The peripheral openings 110 are flared, the cross section of the openings 110 getting larger in a downward direction. Although the peripheral openings 110 do not overlap on the top side 142 of the annular ring 100 as shown in FIG. 4, the peripheral openings 110 overlap on the bottom side 144 of the annular ring 100 due to the flare as shown in FIG. 3. The overlapping of the peripheral openings 110 on the bottom side 144 of the annular ring 100 facilitates alignment of the pins 150, 152 with the associated openings 110 even when the axes of the pins 150, 152 are offset from the axes of the associated openings 110 in a horizontal direction as the pins 150, 152 are raised up into the openings 110 from below (or the annular ring 100 is lowered to cause the pins 150, 152 to enter the associated openings 110 from below). Although the peripheral openings 110 have a heart-shaped cross section in the illustrated embodiments, the peripheral openings 110 may very well have a different cross section, such as, for example, a circular cross section.

The three device coupling members 52, 56, 60 carried, respectively, by the bed 50, the arm system 54 and the cart 58 are generally identical. As shown in FIGS. 9-11, each device coupling member 52, 56, 60 includes an upwardly-extending central pin 148 and a pair of upwardly-extending laterally-spaced pins 150, 152 which are located radially outwardly of the central pin 148. Further, each coupling member 52, 56, 60 includes a body 160 that carries the pins 148, 150, 152. An arm 162 extends outwardly from the body 160 and is coupled to the associated device 50, 54, 58 as shown, for example, in FIGS. 6, 7, 8, respectively. In the illustrated embodiment, the arm 162 is about 10 inches long to allow the equipment support 20 to clear obstructions as the arm 162 is pivoted to position the equipment support 20. When the equipment support 20 is carried by a coupling member 52, 56, 60, the central pin 148 is received in the central opening 108 in the lower portion 102 the central post 74 and the laterally-spaced pins 150, 152 are received in two of the peripheral openings 110 in the annular ring 100, such as the two openings 112, 116, as shown, for example, in FIG. 2. In the illustrated embodiment, due to design considerations, the laterally-spaced pins 150, 152 are received in a pair of non-adjacent peripheral openings 110, such as, for example, the peripheral openings 112, 116. In some other embodiments, however, the laterally-spaced pins 150, 152 may be received in a pair of adjacent peripheral openings 110, such as, for example, peripheral openings 112, 114.

As shown in FIGS. 9-11, the central pin 148 has a truncated cylindrical lower portion 170 and a truncated upwardly-tapering upper portion 172. The truncated cylindrical lower portion 170 of the central pin 148 has an outwardly-facing convex surface 176 that is configured to abut an inner surface 178 of a tubular lower portion 103 of the central post 74, as shown, for example, in FIG. 11, when the equipment support 20 is carried by a device coupling member 52, 56, 60. In the illustrated embodiment, when the equipment support 20 is carried by a coupling member 52, 56, 60, the outwardly-facing convex surface 176 of the central pin 148 defines a circular arc having a center that is generally coincident with the longitudinal axis 106 of the central post 74 of the equipment support 20. As used in the specification and claims, the term "outwardly-facing" means away from the longitudinal axis 106 of the central post 74. The upper portion 172 of the central pin 148 is tapered from wide to narrow in an upward direction to facilitate reception of the central pin 148 in the annular opening 108.

Continuing reference to FIGS. 9-11, the lower and upper portions 170, 172 of the central pin 148 define a pair of inwardly-facing planar surfaces 180, 182 which intersect to form an angle. As used in the specification and claims, the term "inwardly-facing" means toward the longitudinal axis 106 of the central post 74. In the illustrated embodiment, the planar surfaces 180 of the central pin 148 form an obtuse angle. As shown, for example, in FIG. 2, the central pin 148 is dimensioned to allow two such central pins 148 to be simultaneously received in the central opening 108 in the lower portion 102 of the central post 74 during the transfer of the equipment support 20 from a first one of the devices 50, 54, 58 to a second one of the devices 50, 54, 58. For example, as shown in FIG. 11, the maximum thickness of the central pin 148 (about 0.350 inches) is less than the radius (about 0.500 inches) of the central opening 108 in the lower portion 102 of the central post 74. The maximum width (about 0.700 inches) of the central pin 148 is less than the diameter (about 1.000 inches) of the central opening 108.

When the equipment support 20 is lowered to engage the support pins 148, 150, 152 (or the support pins 148, 150, 152 raised to engage the equipment support 20), the laterally-spaced pins 150, 152 enter the associated peripheral openings 110 before the central pin 148 enters the central opening 108, as shown, for example, in FIG. 2 with respect to the pins 148, 150, 152 of the arm system 54, to facilitate the alignment of the pins 148, 150, 152 with the associated openings 108, 110. As shown in FIGS. 9-11, the laterally-spaced pins 150, 152 are generally circular in cross section and are tapered from wide to narrow in an upward direction to facilitate insertion of the pins 150, 152 into the associated openings 110. The heart-shaped cross section of the openings 110 facilitates engagement between the tapered pins 150, 152 and the openings 110 even when the alignment between the axes of the pins 150, 152 and the axes of the openings 110 is slightly off as the annular ring 100 is lowered to engage the pins 150, 152 or the pins 150, 152 are raised to engage the annular ring 100. In addition, the downward flaring of the peripheral openings 110 causes the pins 150, 152 to self align in the openings 110 if the pins 150, 152 are not aligned and there is some allowable movement.

As shown in FIGS. 9-11, in the illustrated embodiment, the body 160 of the device coupling member 52, 56, 60 has a truncated cylindrical lower portion 190, a truncated tapered intermediate portion 192 and a truncated cylindrical upper portion 194. The intermediate portion 192 tapers in width from, narrow to wide, in an upward direction. The central pin 148 is coupled to a downwardly-facing surface 200 of the lower portion 190 of the body 160 by a coupling portion 202 that extends rearwardly from the lower portion 170 of the central pin 148. The coupling portion 202 is secured to the downwardly-facing surface 200 of the body 160 by suitable fasteners, such as screws 203 as shown in FIG. 11. The screws 203 extend through slightly oversized openings in the coupling portion 202 and are then screwed into the body 160 of the coupling member 52, 56, 60. In the illustrated embodiment, the coupling portion 202 is integrally formed with the lower portion 170 of the central pin 148.

Continuing reference to FIGS. 9-11, the laterally-spaced pins 150, 152 are coupled to and extend upwardly from an upwardly-facing surface 204 of the upper portion of the body 160. When the equipment support 20 is supported by a device coupling member 52, 56, 60, the downwardly-facing surface 144 of the annular ring 100 rests on the upwardly-facing surface 204 of the body 160 of the associated coupling member 52, 56, 60 as shown, for example, in FIG. 2 and the downwardly-facing surface 206 of the tubular lower portion 103 of the central post 74 rests on an upwardly-facing surface 208 of the coupling portion 202 integrally formed with the central pin 148 as shown, for example, in FIG. 11.

As shown in FIGS. 9-11, the lower, intermediate and upper portions 190, 192, 194 of the body 160 define a pair of inwardly-facing planar surfaces 210, 212 which define a vertically-extending groove 214. In the illustrated embodiment, as shown in FIG. 9, the inwardly-facing planar surfaces 210, 212 of the body 160 are generally coplanar with the inwardly-facing planar surfaces 180, 182 of the central pin 148. As shown in FIG. 11, the groove 214 has an inwardly-facing concave surface 216 that is configured to abut an outer surface 218 of the tubular lower portion 103 of the central post 74 when the equipment support 20 is carried by an associated device coupling member 52, 56, 60. In the illustrated embodiment, when the equipment support 20 is carried by a coupling member 52, 56, 60, the inwardly-facing concave surface 216 of the groove 214 defines a circular arc having a center that is generally coincident with the longitudinal axis 106 of the central post 74 of the equipment support 20.

As shown in FIG. 11, the outwardly-facing convex surface 176 of the central pin 148 and the inwardly-facing concave surface 216 of the body 160 define an annular groove 220 in which the tubular lower portion 103 of the central post 74 is received when the equipment support 20 is carried by a device coupling member 52, 56, 60. The spacing between the outwardly-facing convex surface 176 of the central pin 148 and the inwardly-facing concave surface 216 of the body 160 is slightly greater than the wall thickness of the tubular lower portion 103 of the central post 74 to facilitate reception of the tubular lower portion 103 of the central post 74 in the annular groove 220. When the equipment support 20 is carried by a coupling member 52, 56, 60, the outwardly-facing convex surface 176 of the central pin 148 abuts the inner surface 178 of the tubular lower portion 103 of the central post 74 and the inwardly-facing concave surface 216 of the body 160 abuts the outer surface 218 of the tubular lower portion 103 of the central post 74. This reduces the tendency of the equipment support 20 to tip or wobble when carried by a coupling member 52, 56, 60. The pins 148, 150, 152 can be made from any suitable material that is strong and wear resistant to withstand the transfer between the devices 50, 54, 58. For example, in the illustrated embodiment, the pins 148, 150, 152 are made from aluminum bronze material and the body 160 and the arm 162 are made from aluminum. In other embodiments, however, the body 160 and the arm 162 may be made from steel.

Figure 6:
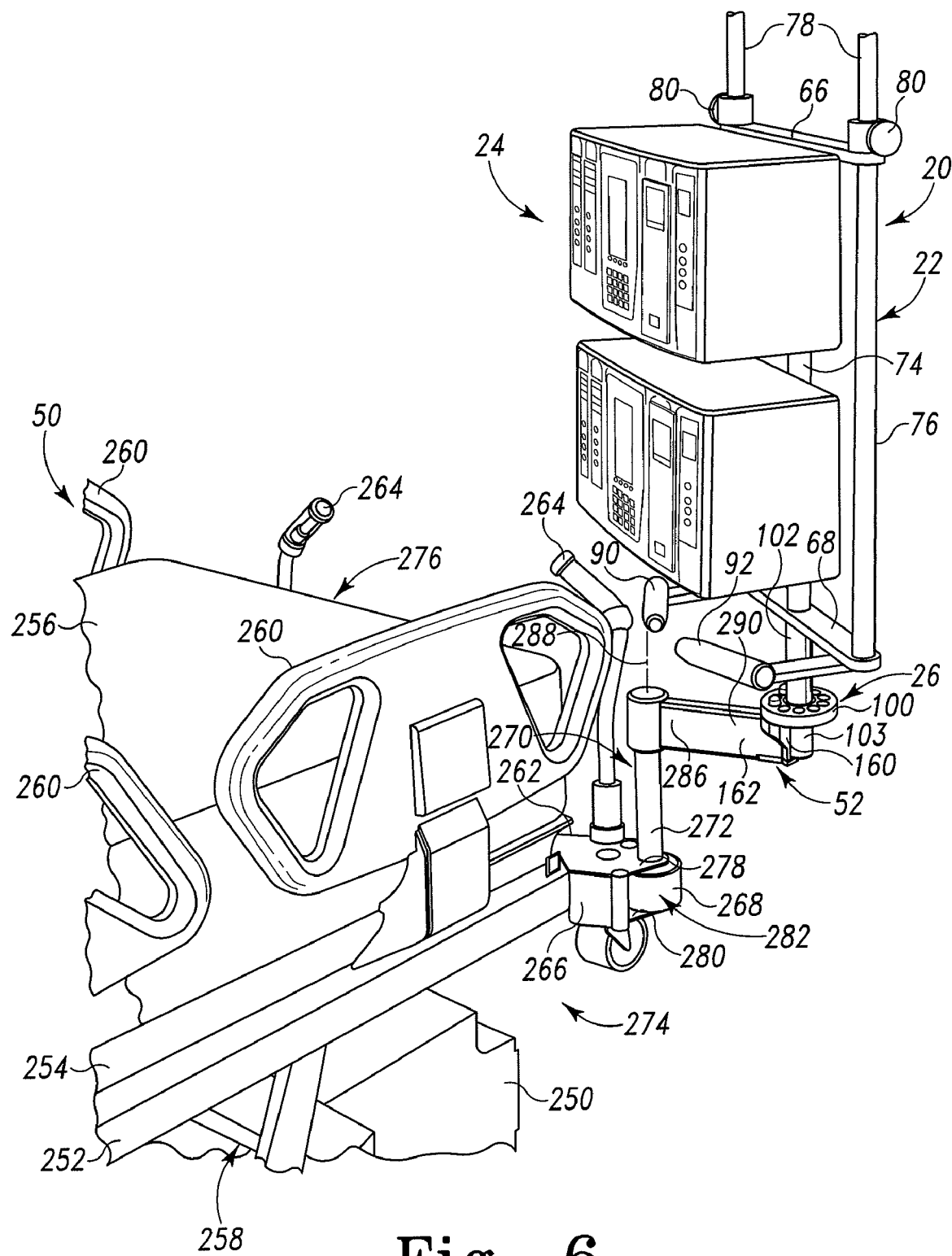
FIG. 6 is a perspective view of a hospital bed having a first coupling member.

The bed 50 carries the first coupling member 52. As shown in FIG. 6, the bed 50 includes a lower frame 250 supported on casters (not shown), an intermediate frame 252, and a patient-support deck 254 supporting a mattress 256. A linkage 258 connects the intermediate frame 252 to the lower frame 250. The linkage 258 is operable to raise, lower, and tilt the intermediate frame 252 and the deck 254 relative to the lower frame 250. The bed 250 includes head and foot-end side rails 260. In the illustrated embodiment, the intermediate frame 252 includes a head-end frame member 262, which is configured to extend horizontally beyond the periphery of the deck 254 such that certain items can be mounted thereon, including, for example, push handles 264 and corner brackets 266 carrying roller bumpers 268.

A bed mount 270 includes a post 272 that extends upwardly from the corner bracket 266 located on a left side 274 of the bed 50 near a head end 276 thereof. Each corner bracket 266 comprises a pair of vertically-spaced flanges 278, 280 defining a bumper-receiving space 282 in which the associated roller bumper 268 is received. A lower portion 284 of the post 272 extends through an opening in the upper flange 278, through a central opening in the roller bumper 268, and finally through an opening in the lower flange 280. The arm 162 of the first coupling member 52 has a proximal end 286 coupled to the post 272 for pivoting movement about a pivot axis 288. The body 160 of the first coupling member 52 is coupled to a distal end 290 of the arm 162. As shown in FIG. 6, the support pins 148, 150, 152 of the first coupling member 52 engage the openings 108, 110 of the equipment support coupler 26 when the equipment support 20 is carried by the bed 50. In the illustrated embodiment, the pivoting arm 162 is about 10 inches long to allow the equipment support 20 to clear obstructions as the arm 162 is pivoted to position the equipment support 20. The bed 50 may be of the type marketed by Hill-Rom Company, Inc. as TotalCare™ hospital bed.

Figure 7:
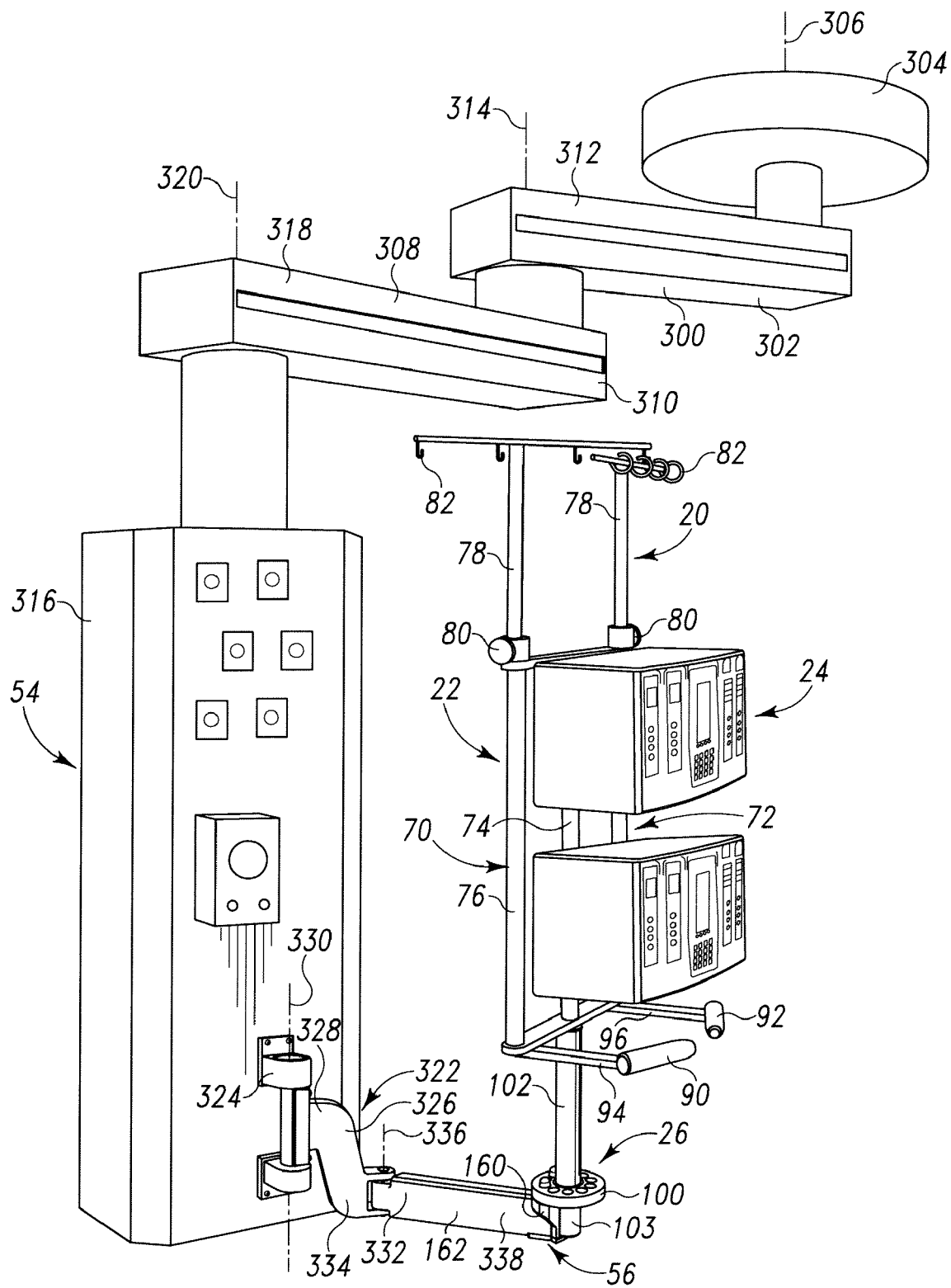
FIG. 7 is a perspective view of an arm system having a second coupling member.

The arm system 54 carries the second coupling member 56. As shown in FIG. 7, the arm system 54 includes a first radial arm 300 that has a proximal end 302 coupled to a ceiling structure 304 for pivoting movement about a first pivot axis 306, a second radial arm 308 that has a proximal end 310 coupled to a distal end 312 of the first radial arm 300 for pivoting movement about a second pivot axis 314, and a downwardly-extending service head 316 coupled to a distal end 318 of the second radial arm 308 for pivoting movement about a third pivot axis 320. An arm mount 322 includes a mounting bracket 324 coupled to the service head 316. A first arm 326 has a proximal end 328 coupled to the mounting bracket 324 for pivoting movement about a first pivot axis 330. The arm 162 of the second coupling member 56 has a proximal end 332 coupled to a distal end 334 of the first arm 326 for pivoting movement about a second pivot axis 336. The body 160 of the second coupling member 56 is coupled to a distal end 338 of the arm 162. The support pins 148, 150, 152 of the second coupling member 56 engage the openings 108, 110 of the equipment support coupler 26 when the equipment support 20 is carried by the arm system 54. In the illustrated embodiment, the pivoting arm 162 is about 10 inches long to allow the equipment support 20 to clear obstructions as the arm 162 is pivoted to position the equipment support 20. The arm system 54 may be of the type marketed by Hill-Rom Company, Inc. as Latitude™ Arm System.

Figure 8:
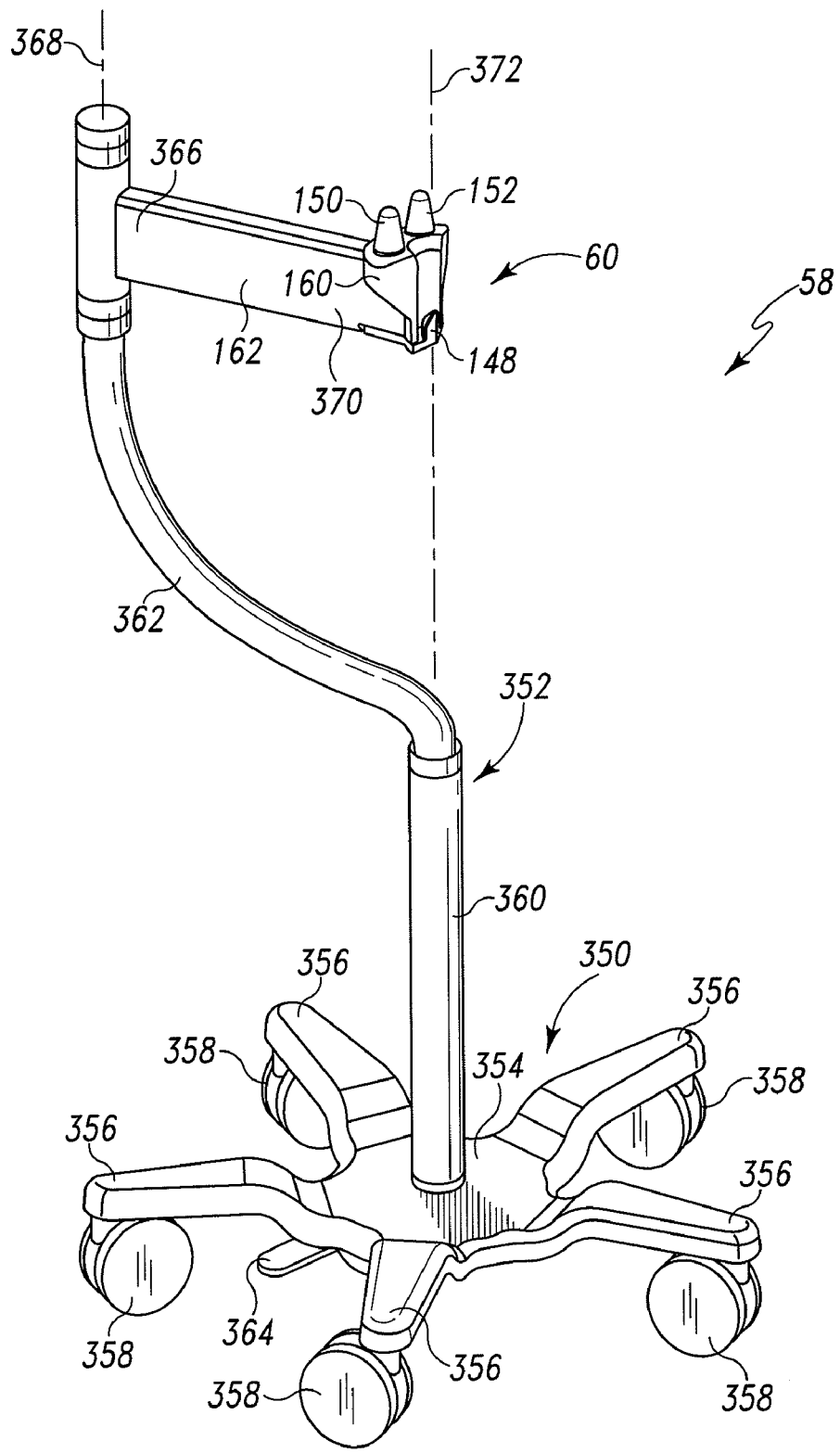
FIG. 8 is a perspective view of a wheeled cart having a third coupling member.

The cart 58 carries the third coupling member 60. As shown in FIG. 8, the cart 58 includes a wheeled base 350 and a telescoping column 352 extending upwardly from the base 350. The base 350 has a central hub 354 and five spokes 356 radiating substantially horizontally outwardly from the central hub 354. Casters 358 are coupled to distal ends of the spokes 356. In the illustrated embodiment, the column 352 includes an outer tube 360 extending upwardly from the central hub 354 and a bent inner tube 362 that telescopes into and out of the outer tube 360. In the illustrated embodiment, a manually operable locking mechanism, such as a gas spring (not shown), is located inside the outer tube 360 to releasably secure the inner tube 362 in a selected vertical position relative to the outer tube 360. A release pedal 364 extends outwardly from the base 350 and is operable to unlock the gas spring. The arm 162 of the third coupling member 60 has a proximal end 366 coupled to the inner tube 362 for pivoting movement about a pivot axis 368. The body 160 of the third coupling member 60 is coupled to a distal end 370 of the arm 162. The support pins 148, 150, 152 of the third coupling member 60 engage the openings 108, 110 of the equipment support coupler 26 when the equipment support 20 is carried by the cart 58. As shown in FIG. 8, in the illustrated embodiment, the inner tube 362 is bent to keep the axis 106 of the equipment support 20 generally aligned with the axis 372 of the wheeled base 350 to reduce the tendency of the cart 58 to tip. In the illustrated embodiment, the pivoting arm 162 is about 10 inches long to allow the equipment support 20 to clear obstructions as the arm 162 is pivoted to position the equipment support 20.

As shown in FIGS. 1-2, when the equipment support 20 is carried by the bed 50, the central pin 148 of the first coupling member 52 is received in the central opening 108 in the lower portion 102 of the central post 74 and the laterally-spaced pins 150, 152 of the first coupling member 52 are received in a pair of peripheral openings 110 in the annular ring 100, for example, the peripheral openings 112, 116.

To transfer the equipment support 20 from the bed 50 to the arm system 54, the arm 162 of the second coupling member 56 is moved to a position where the central pin 148 of the second coupling member 56 is located below the central opening 108 in the lower portion 102 of the central post 74 and the laterally-spaced pins 150, 152 of the second coupling member 56 are located below a pair of peripheral openings 110 in the annular ring 100, for example, the peripheral openings 120, 124 as shown, for example, in FIG. 3. The arm 162 of the first coupling member 52 is then lowered (or, in the alternative, the arm 162 of the second coupling member 56 is raised) to a position where the central pin 148 of the first coupling member 52 is located below the downwardly-facing surface 206 (FIG. 11) of the lower portion 103 of the central post 74 and the laterally-spaced pins 150, 152 of the first coupling member 52 are located below the downwardly-facing surface 144 of the annular ring 100. The arm system 54 can then be moved away from the bed 50 with the arm system 54 carrying the equipment support 20 (or the bed 50 moved away from the arm system 54 with the arm system 54 carrying the equipment support 20). The equipment support 20 can be transferred similarly from the arm system 54 to the cart 58 and from the cart 58 to the bed 50. Thus, the equipment support 20 can be transferred from the bed 50 to the arm system 54 to the cart 58, and back to the bed 50. Likewise, the equipment support 20 can be transferred from the bed 50 to the cart 58 to the arm system 54, and back to the bed 50.

The equipment support coupler 26 includes a lock (not shown) to secure the equipment support coupler 26 to the associated device coupling member 52, 56, 60 to prevent inadvertent removal of the pins 148, 150, 152 of the coupling member 52, 56, 60 from the associated openings 108, 110 of the coupler 26.

Although the invention has been described in detail with reference to certain illustrative embodiments, variations and modifications exist with the scope and spirit of this disclosure as described and defined in the following claims.

The invention claimed is:

1. A patient care equipment support for use with a device having a coupling, the equipment support comprising:
   an equipment supporting portion configured to support patient care equipment, and
   a coupler extending downwardly from the equipment supporting portion, the coupler having a post with a central opening and an annular ring coupled to the post and having a plurality of peripheral openings disposed about the central opening, the coupling having a first portion that extends upwardly into the central opening with an upper end of the first portion terminating within the central opening of the post when the equipment support is carried by the device, and the coupling having a second portion extending upwardly into at least one of the peripheral openings of the annular ring when the equipment support is carried by the device.

2. The equipment support of claim 1, wherein the central opening is located below the plurality of the peripheral openings.

3. The equipment support of claim 1, wherein the plurality of peripheral openings are arranged in a generally circular pattern concentric with the central opening.

4. The equipment support of claim 1, wherein the post has a lower portion extending downwardly from the annular ring.

5. The equipment support of claim 4, wherein the central opening of the post has a generally circular cross section.

6. The equipment support of claim 4, wherein the second portion of the coupling comprises a pair of pins that are received in a respective pair of adjacent peripheral openings of the annular ring when the equipment support is carried by the device.

7. The equipment support of claim 6, wherein the central opening opens through a downwardly-facing surface of the post.

8. The equipment support of claim 6, wherein the central opening is located at a lower elevation than the plurality of the peripheral openings.

9. The equipment support of claim 4, wherein the post has an upper portion extending upwardly from the annular ring.

10. The equipment support of claim 4, wherein a first distance between the annular ring and the equipment supporting portion is greater than a second distance between the annular ring and a lower end of the post.

11. The equipment support of claim 4, wherein the post is rotatable relative to the annular ring about a longitudinal axis.

12. The equipment support of claim 1, wherein each peripheral opening has a non-round cross section.

13. The equipment support of claim 1, wherein each peripheral opening has a generally heart-shaped cross section.

14. The equipment support of claim 1, wherein each peripheral opening has an upwardly tapering conical wall.

15. The equipment support of claim 1, wherein the plurality of peripheral openings comprises ten openings arranged in a generally circular pattern concentric with the central opening.

16. The equipment support of claim 1, wherein the equipment support comprises one of an IV pole and a rack adapted to carry infusion equipment.

17. The equipment support of claim 1, wherein the device comprises one of a hospital bed, an arm system, a wheeled cart or stand, a surgery table and a stretcher.

18. A patient care equipment support comprising:
   an equipment supporting portion configured to support patient care equipment, and
   a post extending downwardly from the equipment supporting portion, the post having a central opening, and
   an annular member coupled to a lower portion of the post with a first portion of the post extending downwardly from the annular member and a second portion of the post extending upwardly from the annular member, the annular member having a plurality of peripheral openings arranged in a generally circular pattern concentric with the central opening.

19. The equipment support of claim 18, wherein the post has a generally circular cross section.

20. The equipment support of claim 18, wherein the central opening opens through a downwardly-facing surface of the post.

21. An apparatus for use with a patient care equipment support that has a first coupler having a post with a central opening and an annular ring with a plurality of peripheral openings arranged in a generally circular pattern concentric with the central opening, the apparatus comprising:
   a support,
   an arm extending outwardly from the support, and
   a second coupler including a coupling member carried by the arm and having an upwardly extending lower pin configured to engage the central opening and the second coupler further including a body carried by the arm and two upper pins extending upwardly from the body to be received in two respective peripheral openings of the plurality of peripheral openings when the equipment support is carried by the apparatus.

22. The apparatus of claim 21, wherein the body of the second coupler has a concave surface that abuts an outer surface of the post when the equipment support is carried by the apparatus.

23. A system comprising:
   a first device having a first coupling,
   a second device having a second coupling, and
   a patient care equipment support comprising:

an equipment supporting portion configured to support patient care equipment, and a coupler extending downwardly from the equipment supporting portion, the coupler having a post with a central opening and an annular member with a plurality of peripheral openings disposed about the central opening, wherein the first coupling includes a first portion received in the central opening and a second portion received in at least one of the peripheral openings when the equipment support is carried by the first device, and wherein the second coupling includes a third portion received in the central opening and a fourth portion received in at least one of the remaining peripheral openings when the equipment support is transferred to the second device, wherein first and third portions of the first coupling and second coupling, respectively, occupy respective portions of the central opening at the same time during transfer of the patient care equipment support from the first device to the second device.

24. The system of claim 23, wherein the equipment support is transferred from the first device to the second device as the first coupling carrying the equipment support is lowered while the second coupling is generally aligned with the central opening and said at least one of the remaining peripheral openings to a position where the first coupling is at a lower elevation than the coupler permitting the second coupling to carry the equipment support and allowing the first device to move away from the second device.

25. The system of claim 23, wherein the equipment support is transferred from the first device to the second device by raising the second coupling while the second coupling is generally aligned with the central opening and said at least one of the remaining peripheral openings to a position where the coupler is at a higher elevation than the first coupling permitting the second coupling to carry the equipment support and allowing the first device to move away from the second device.

26. A patient care equipment support transferable between a first device having a first coupling and a second device having a second coupling, the equipment support comprising:

an equipment supporting portion configured to support patient care equipment, and a coupler extending downwardly from the equipment supporting portion, the coupler having a central opening and a plurality of peripheral openings disposed about the central opening, wherein the first coupling engages the central opening and a first set of two peripheral openings and the second coupling engages the central opening and a second set of two peripheral openings as the patient care equipment support is transferred from the first device to the second device, wherein portions of the first coupling and second coupling occupy respective portions of the central opening at the same time during transfer of the patient care equipment support from the first device to the second device.

27. The equipment support of claim 26, wherein the equipment support comprises one of an IV pole and a rack adapted to carry infusion equipment.

28. The equipment support of claim 26, wherein the first device comprises one of a hospital bed, an arm system, a wheeled cart or stand, a surgery table and a stretcher.

29. The equipment support of claim 26, wherein the second device comprises one of a hospital bed, an arm system, a wheeled cart or stand, a surgery table and a stretcher.

* * * * *